United States Patent Office 3,144,788
Patented Aug. 18, 1964

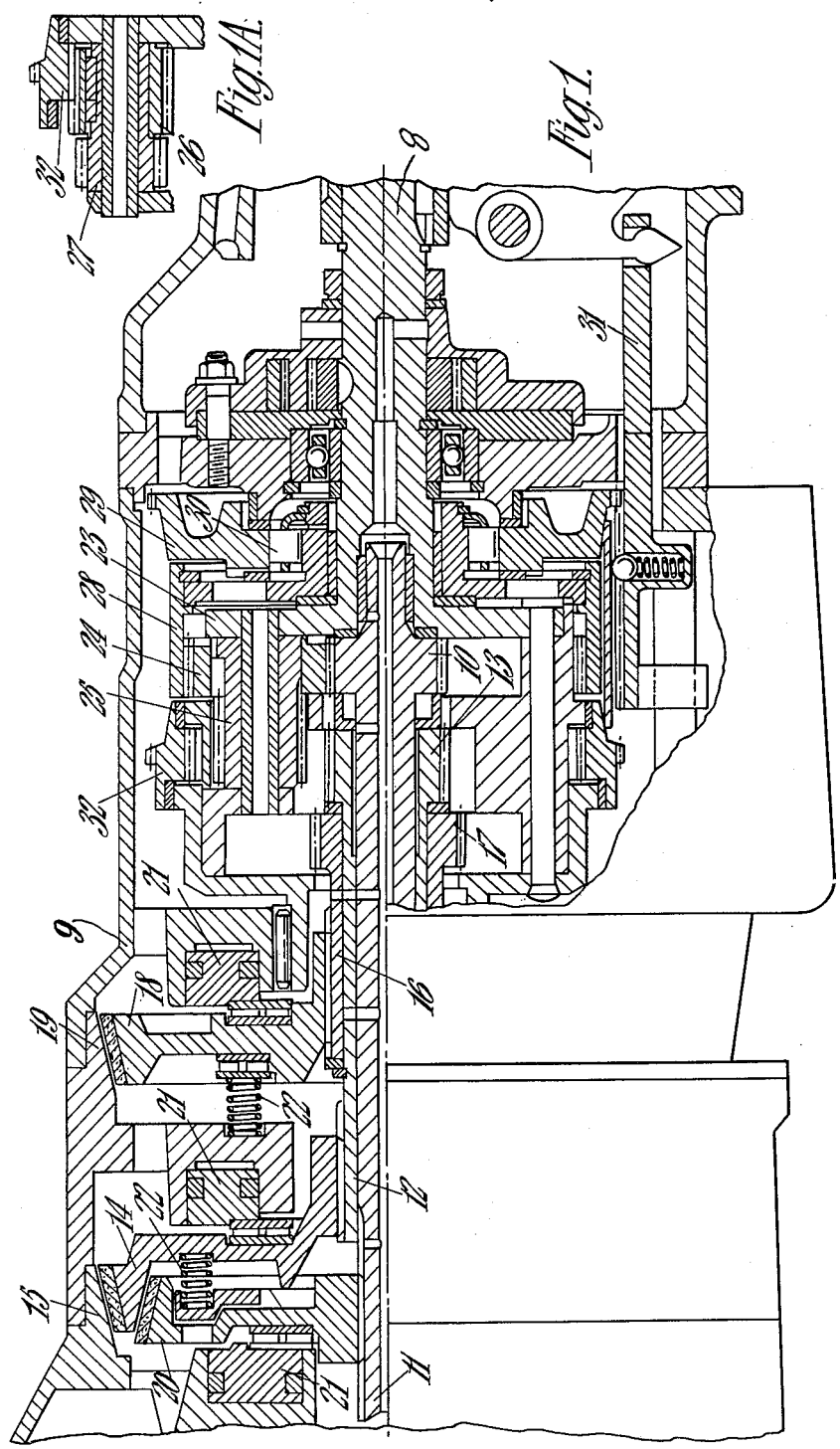

3,144,788
VARIABLE SPEED POWER TRANSMISSION
MECHANISM FOR VEHICLES
Axel Charles Wickman, 14 S. Hibiscus Drive,
Hibiscus Island, Miami Beach, Fla.
Filed June 12, 1961, Ser. No. 116,453
Claims priority, application Great Britain June 29, 1960
1 Claim. (Cl. 74—761)

This invention has for its object to provide in a compact and convenient form an epicyclic power transmission mechanism for vehicles, adapted to provide four speed ratios in the forward direction and a reverse motion.

The invention will now be described with reference to the accompanying drawings wherein:

FIGURE 1 is a sectional view illustrating a 4-speed forward and reverse drive mechanism embodying the invention, and FIGURE 1a is a fragmentary view illustrating a part of the planet pinion arrangement shown in FIGURE 1.

In the example shown in the drawings the driving sun pinion 10 is formed on or secured to the input shaft 11 of the mechanism, which shaft is rotatably mounted in a housing 9 and is adapted to be driven by the engine. There is also provided a sleeve 12 which is co-axial with the shaft 11 and on which is formed or secured the first of the reaction sun pinions 13, and on this sleeve is attached an axially slidable brake disc 14 adapted at its periphery for frictional engagement with a complementary annular member 15 formed on or secured to the housing of the mechanism. Outside said sleeve 12 is mounted another sleeve 16 on which is formed or to which is secured the second reaction sun pinion 17, and on this sleeve is attached another axially slidable brake disc 18 adapted at its periphery for frictional engagement with a second complementary member 19 on the housing. Further there is provided a clutch disc 20 which is frictionally engageable with the disc 14 for interlocking the input shaft and the first reaction sun pinion 13.

The slidable brake and clutch discs are movable to their operative positions by hydraulic means in the form of hydraulically operated pistons indicated by reference numeral 21 either automatically or under the control of the driver, and movement in the opposite direction is effected by springs 22.

On the output shaft 8 of the mechanism is formed or secured a planet pinion carrier 23, and on this is mounted an assembly of compound planet pinions 24, 25 and 26, 27. Although only one example of each pinion is shown the construction actually includes three pinions of each type. Each pinion 24 engages the driving sun pinion 10 whilst the associated pinion 25, which is secured to pinion 24, engages pinion 26. Pinions 26 also engage the first reaction sun pinion 13 and pinion 27, which are secured respectively to pinions 26, engage the second reaction sun pinion 17.

The planet pinions 24, which engage the driving sun pinion 10 also engage an internally toothed and rotatable reaction annulus 28 which is connected to a rotatable control ring 29 through a unidirectional clutch 30, which ring can be held against rotation by driver operable means 31.

Further there is also provided in engagement with planet pinions 26, a rotatable internally toothed reversing annulus 32 which can be held against rotation by said driver-operable means 31 when it is required to impart reverse rotation to the output shaft 8.

The mode of action of the mechanism above described is as follows:

To obtain the first speed drive the reaction annulus 28 associated with the planet pinions engaging the driving sun pinion is held against rotation by the action of the driver-operable means 31 on the control ring 29. To obtain the second speed the second reaction sun pinion 17 is locked to the housing by disc 18. To obtain the third speed said brake disc 18 associated with the second reaction sun pinion 17 is released and the brake 14 associated with the first reaction sun pinion 13 is engaged with the housing. During the second and third speeds said reaction annulus 28 can over-run the unidirectional clutch 30 connecting it to the control ring 29. The fourth speed is obtained by interengaging the clutch discs 20 and 14, thus disengaging from the housing the disc 18 previously engaging it, the reaction annulus 28 continuing to overrun the unidirectional clutch 30. To obtain reverse rotation of the output shaft the driver-operable control means 31 acting on the control ring 29 is caused to release this ring and arrest the reaction annulus 32 associated with the planet pinions 26 acting on the first reaction sun pinion 13, the other brakes being free.

Having thus described my invention what I claim as new and desire to secure by Letters Patent is:

An epicyclic power transmission mechanism comprising a housing, a single input shaft rotatably mounted in said housing, a driving sun pinion on said input shaft, first and second reaction sun pinions rotatably mounted in said housing, first and second brake means for locking said first and second reaction sun pinions respectively relative to the housing, clutch means for interlocking said first reaction sun pinion with said input shaft, an internally toothed reaction annulus rotatably mounted in said housing, a control ring for said reaction annulus rotatably mounted in said housing, driver-operable means for locking said control ring relative to the housing, a unidirectional clutch interconnecting said reaction annulus and said control ring, an internally toothed reversing annulus rotatably mounted in said housing, a driver-operable means for locking said reversing annulus relative to said housing, an output shaft rotatably mounted in said housing, a planet pinion carrier on said output shaft, planet pinions rotatably mounted on said planet pinion carrier and interengaging said first and second reaction sun pinions with said reversing annulus, and further planet pinions rotatably mounted on said planet pinion carrier and interengaging said driving sun pinion with said reaction annulus and with said first-mentioned planet pinions.

References Cited in the file of this patent
UNITED STATES PATENTS

| | | |
|---|---|---|
| 2,462,657 | McNairy | Feb. 22, 1949 |
| 2,616,308 | Burnett | Nov. 4, 1952 |
| 2,892,365 | Winther | June 30, 1959 |
| 2,936,865 | Tuck et al. | May 17, 1960 |